US012652450B2

(12) United States Patent
Yuen et al.

(10) Patent No.: US 12,652,450 B2
(45) Date of Patent: Jun. 9, 2026

(54) CAMERA ILLUMINATION DEVICE WITH A COMMON LENS ARRAY FOR DIFFERENT ILLUMINATION STRUCTURES

(71) Applicant: ASMPT GmbH & Co. KG, Munich (DE)

(72) Inventors: Julia Yuen, Munich (DE); Karl-Heinz Besch, Olching (DE); Matthias Hedrich, Wolfratschausen (DE); Christian Schauer, Munich (DE); Angelika Hofmann, Munich (DE)

(73) Assignee: ASMPT GmbH & Co. KG (DE)

( * ) Notice: Subject to any disclaimer, the term of this patent is extended or adjusted under 35 U.S.C. 154(b) by 109 days.

(21) Appl. No.: 18/394,261

(22) Filed: Dec. 22, 2023

(65) Prior Publication Data

US 2024/0214664 A1     Jun. 27, 2024

(30) Foreign Application Priority Data

Dec. 27, 2022    (DE) ..................... 10 2022 134 863.6

(51) Int. Cl.
*H04N 23/56*        (2023.01)
*G02B 7/02*         (2021.01)
(Continued)

(52) U.S. Cl.
CPC ............. *H04N 23/56* (2023.01); *G02B 7/021* (2013.01); *G02B 27/126* (2013.01); *G02B 27/30* (2013.01);
(Continued)

(58) Field of Classification Search
CPC ........ H04N 23/56; H04N 23/58; H04N 23/51; H04N 23/90; H04N 23/55; G02B 7/0021; G02B 27/126; G02B 27/30
See application file for complete search history.

(56) References Cited

U.S. PATENT DOCUMENTS

2017/0090180 A1* 3/2017 Ehrhardt .............. G02B 27/149
2017/0299958 A1* 10/2017 Kawasumi ......... G03B 21/2066
(Continued)

FOREIGN PATENT DOCUMENTS

CN      112859483 A     5/2021
CN      217484505 U     9/2022
(Continued)

*Primary Examiner* — Jonathan R Messmore
(74) *Attorney, Agent, or Firm* — OSTROLENK FABER LLP

(57)                ABSTRACT

The invention relates to a camera (130) for detecting objects (192), the camera (130) comprising (a) an illumination device (240) for illuminating an object (192) which is located in an object plane (230*a*) of the camera (130); and (b) a camera sensor (285) for capturing an image of the object (192) illuminated by the illumination device (240). The illumination device (240) has (a1) a first illumination structure (350) with a plurality of first light sources (351) for illuminating the object (192) with a first illumination light (352) at a first illumination angle; (a2) a second illumination structure (360) having a plurality of second light sources (361) for illuminating the object (192) with a second illumination light (362) at a second illumination angle that is different from the first illumination angle; and (a3) an optical lens array (354) with a plurality of individual lenses (355) for collimating the first illumination light (352) and for collimating the second illumination light (362). Each individual lens (355) is assigned at least a first light source (351) and each individual lens (355) is assigned at least two second light sources (361). The invention further relates to a camera system (125) with two such cameras (130) and an automated placement machine having at least one such camera (130).

23 Claims, 3 Drawing Sheets

(51) Int. Cl.

| | | |
|---|---|---|
| *G02B 27/12* | (2006.01) | |
| *G02B 27/30* | (2006.01) | |
| *H04N 23/51* | (2023.01) | |
| *H04N 23/55* | (2023.01) | |
| *H04N 23/58* | (2023.01) | |
| *H04N 23/90* | (2023.01) | |

(52) U.S. Cl.
CPC ............. *H04N 23/51* (2023.01); *H04N 23/55* (2023.01); *H04N 23/58* (2023.01); *H04N 23/90* (2023.01)

(56) References Cited

U.S. PATENT DOCUMENTS

| | | | |
|---|---|---|---|
| 2022/0120412 A1* | 4/2022 | Bremerich | ................ F21V 7/09 |
| 2022/0163423 A1* | 5/2022 | Sun | .................... G01M 11/0264 |

FOREIGN PATENT DOCUMENTS

| | | |
|---|---|---|
| DE | 102019112340 A1 | 11/2020 |
| DE | 102020116385 B3 | 9/2021 |
| DE | 102022118487 A1 | 1/2024 |
| JP | 2005-072298 A | 3/2005 |
| JP | 2010-253895 A | 11/2010 |
| JP | 2015-018888 A | 1/2015 |
| JP | 2020-502744 A | 1/2020 |
| JP | 2022-002307 A | 1/2022 |
| JP | 2022-036349 A | 3/2022 |

* cited by examiner

CAMERA ILLUMINATION DEVICE WITH A COMMON LENS ARRAY FOR DIFFERENT ILLUMINATION STRUCTURES

TECHNICAL FIELD

The present invention generally relates to the technical field of cameras that monitor automated processes in industrial production engineering. The present invention relates in particular to a camera for optically detecting electronic assembly parts, the camera comprising (i) an illumination device for illuminating an electronic assembly part and (ii) a camera sensor for capturing an image of the electronic assembly part illuminated by the illumination device. The present invention further relates to a placement head for the automatic placement of assembly part carriers, having (at least one) such a camera. The present invention also relates to an automated placement machine with (at least one) such a placement head.

BACKGROUND OF THE INVENTION

During the automatic assembly of assembly part carriers using an automated placement machine, electronic assembly parts are picked up from an assembly part supplying device by a placement head, transferred to a placement area of the automated placement machine and placed there on the relevant assembly part carrier at predetermined assembly part installation positions. For example, in order to detect the angular position and the position of an assembly part which is held by an assembly part holding device of the placement head during the transfer from the assembly part supplying device to the placement area, cameras are used that are attached to the placement head. In this way, the angular position and position can be detected without any additional loss of time for assembly and the angular position can be adjusted by rotating the assembly part holding device so that the assembly part in question is placed on the assembly part carrier in the correct orientation.

Cameras that are attached to a placement head usually have an illumination device that illuminates the assembly parts to be captured, so that a sufficiently bright image of the assembly part can be captured with a short exposure time. A suitable illumination device typically includes several illumination structures, each of which illuminates the assembly part to be detected at a specific illumination angle. An illumination structure comprises at least one light source, usually at least one light-emitting diode (LED), and typically also at least one illumination optics device, through which the illumination light emitted by the light source is collimated.

Every illumination angle and therefore every illumination structure has the task of highlighting other object properties for image processing. The different illumination angles can be generated by a different spatial arrangement of the illumination structures in relation to the object, i.e. to the electronic assembly part. For example, a flat, distant illumination structure creates a steep illumination that hits the object at an angle of at least approximately 0°. Ring-shaped illumination structures arranged at different distances from the object, possibly with suitable illumination optics, can produce "ring lights" with an angle of, for example, between 30° and 80°.

The required brightness for the illumination can be achieved by using a correspondingly high number of light sources.

Even if comparatively small LEDs are used as light sources, the large number of LEDs required for high brightness requires a comparatively large installation space. Furthermore, illumination optics of the different illumination structures and the respective beam paths of the illumination light require a comparatively large space in order to be able to "direct" the illumination light efficiently onto the object. This results in a large overall installation space for a camera with an illumination device, which must be "reserved" in a placement head for the optical detection of the electronic assembly parts. In a so-called turret placement head, which has a plurality of assembly part holding devices arranged on a circular ring carrier and which can be rotated together about an axis of rotation, a large installation space for a camera means that the rotation angle range for the assembly part holding devices on the circular ring carrier is reduced, in which rotation angle range electronic assembly parts (i) can be picked up by an assembly part supplying device and/or (ii) picked up electronic assembly parts can be placed on the relevant assembly part carrier. This can have a negative impact on the placement performance of the placement head, i.e. on the number of electronic assembly parts that can be picked up and placed within a certain period of time.

SUMMARY OF THE INVENTION

The present invention is based on the object of creating a camera for optically detecting objects and in particular electronic assembly parts, which (i) has an illumination device which enables well-collimated and bright illumination for different illumination angles, and which (ii) can nevertheless be realised within a compact installation space.

This object is achieved by the subject matter of the independent claims. Advantageous embodiments of the present invention are described in the dependent claims.

According to a first aspect of the invention, a camera is described for optically detecting objects, in particular electronic assembly parts. The camera described comprises (a) an illumination device for illuminating an object which is located in an object plane of the camera; and (b) a camera sensor for capturing an image of the object illuminated by the illumination device. The illumination device has (b1) a first illumination structure with a plurality of first light sources for illuminating the object with a first illumination light at a first illumination angle; (b2) a second illumination structure having a plurality of second light sources for illuminating the object with a second illumination light at a second illumination angle that is different from the first illumination angle; and (b3) an optical lens array having a plurality of individual lenses for collimating the first illumination light and for collimating the second illumination light. According to the invention, each individual lens is assigned at least one first light source and each individual lens is assigned at least two second light sources.

The camera described is based on the knowledge that by jointly using the individual lenses of an optical lens array for collimating both the first illumination light and the second illumination light, which ensure illumination of the object at a different angle, the collimation of the light rays of the illumination can be realised within a small installation space. In addition, the use of the common lens array reduces the number of optical components and in particular the number of optics required for the collimation of the light rays.

The lens array described, which can also be referred to as a microlens array, has at least two individual lenses. In order to achieve particularly homogeneous illumination along two spatial directions by the two illumination lights, the lens array can have a square number of individual lenses. A small design of the camera described, even along directions perpendicular to an optical axis of the camera, can be achieved by a lens array with exactly four individual lenses (and four times at least one first light source). The optical axis of the camera can be an optical axis for the first and/or second illumination light. The optical axis of the camera can also refer to a measuring light or an optical image of the object on the camera sensor.

In this document, homogeneous illumination is understood to mean, in particular, illumination that illuminates the object in such a way that all partial areas of the object are illuminated with at least approximately the same light intensity perpendicular to an optical axis (of the illumination device) of the camera. This leads to a particularly reliable detection of the object in question.

In this document, an illumination angle does not necessarily mean a single, precisely defined angle. Rather, the two illumination angles can encompass a certain angular range or a certain angular spectrum around a target angle, for example due to never perfect optical collimation. Preferably, the two angular ranges are selected and the two illumination angles are so different that there is no overlap between the light rays of the first illumination light and the light rays of the second illumination light. The stated angular range for the first illumination light can be, for example, ±3° (plus/minus 3°), ±6°, or possibly ±12°. In embodiments in which the first illumination light is a steep illumination with a first illumination angle of, for example, approximately 0° (0 degrees) and the second illumination light is a somewhat flatter illumination with a second illumination angle of, for example, approximately 30°, the angular range for this is preferred second illumination light (significantly) larger than the angular range for the first illumination light. The angular range for the second illumination light can be, for example, ±10° (plus/minus 1°), ±15°, or possibly ±20°.

In this document, an illumination angle of 0° means illumination light rays that strike the object perpendicularly parallel to an optical axis (of the illumination device) of the camera. An illumination angle of almost 90° corresponds to illumination almost perpendicular to the optical axis and thus to extremely oblique or flat illumination.

The first light sources and/or the second light sources are preferably light-emitting diodes (LEDs). More preferably, the LEDs are so-called high-power light-emitting diodes (high-power LEDs), which each have a luminous flux of at least 3.0 lumens. In order to achieve particularly high luminous fluxes, LEDs in the blue spectral range can be used.

According to an embodiment of the invention with respect to an optical axis of the respective individual lens, the at least one assigned first light source is arranged closer to the optical axis than the at least two assigned second light sources. As a result, a comparatively steep illumination of the object with the first illumination light and a somewhat flatter illumination of the object with the second illumination light can be effected in an advantageous and simple manner with the (at least one) first light source.

If more than one first light source is used, for example four first light sources, these should be arranged as close as possible to the optical axis and preferably symmetrically to the optical axis of the respective individual lens. This can create a steep illumination of the object.

According to a further exemplary embodiment of the invention, each individual lens is assigned exactly one first light source. This has the advantage that the first light source can be arranged exactly in or on the optical axis. This can result in very steep illumination (even at an angle of 0°) of the object.

According to a further embodiment of the invention, at least one individual lens is an aspherical lens, in particular a non-rotationally symmetrical lens.

By using an individual lens whose surface deviates from a spherical segment shape, particularly homogeneous illumination can be achieved by both illumination structures. A suitable aspherical shape can be realised by a so-called free-form lens, which allows the refraction or collimation of the first illumination light and the second illumination light to be optimally adapted to the geometry of the entire (and compactly realised) illumination device.

All individual lenses are preferably aspherical lenses. In some embodiments, all aspherical lenses are the same. This means that they have a three-dimensional (refractive) surface of the same shape. In other embodiments, at least two individual lenses are different, i.e. they have a different three-dimensional (refractive) surface.

With a suitably designed or shaped free-form individual lens, a comparatively wide angular spectrum can be generated for the second illumination light, in contrast to the first illumination light. This can, for example, have illumination angles in the range between 25° to 35°, in the range between 20° to 40° or in the range between 10° and 40°.

According to a further embodiment of the invention the first light sources and the second light sources are arranged (at least approximately) in a common focal plane of all individual lenses. As a result, the illumination device and thus the entire camera can be implemented in a particularly compact design along a direction parallel to the optical axis (of the illumination device) of the camera.

According to a further embodiment of the invention the first light sources and the second light sources are arranged on a common circuit board and are electrically connected. This advantageously simplifies the manufacturing process for the camera described.

According to a further embodiment of the invention the lens array is mounted directly or indirectly on the common circuit board. The lens array, like the light sources, can be placed on the common circuit board using an automatic placement process using an automated placement machine. As a result, not only can the production of the camera be simplified, but in particular a very precise spatial alignment between the lens array and the individual light sources can be achieved due to the typically high placement accuracy of an automated placement machine.

According to a further embodiment of the invention the first light sources are each arranged at a grid point of a two-dimensional regular grid and the second light sources are at least approximately arranged at a further grid point of the two-dimensional regular grid. The first light sources and the second light sources are arranged in a common plane. The common plane can in particular be the aforementioned common focal plane.

In this context, a regular grid is to be understood as a grid which has a "unit grid cell". A plurality of unit grid cells arranged regularly next to one another then forms the regular grid.

The "unit grid cell" can, for example, consist of five grid points, with four grid points forming a square and a further central grid point located face-centred in the middle of the square. With respect to the central grid point, the four grid points mentioned are (immediately) adjacent grid points.

Alternatively, the unit grid cell can also be a purely square unit cell. In this case it is a uniform grid that completely divides the two-dimensional space of the common plane into square areas parallel to the axis, whereby there is always the same distance between two adjacent grid points. In this case, a central grid point, along the side edges of the squares, has four closest adjacent grid points and, along two diagonals of the squares, four further adjacent grid points that are slightly further apart, exactly by the root of two, from the central grid point.

The arrangement of both the first light sources and the second light sources on a two-dimensional regular grid advantageously facilitates calculation of the beam paths of the illumination device. This can also make the structural implementation of the entire camera easier.

According to a further embodiment of the invention a grid point of a first light source is a central grid point which lies on the optical axis of that individual lens which is assigned to the relevant first light source. Furthermore, the further grid points of the second light sources are each an adjacent grid point. In the regular grid, for each central grid point there are a predetermined number of adjacent grid points, which are arranged symmetrically to one another around the central grid point.

By arranging the first light sources on an optical axis of an individual lens, homogeneous illumination of the object can be achieved for the first illumination light. Due to the mutually symmetrical arrangement of the second light sources around the first light source or around this optical axis, homogeneous illumination of the object can also be achieved for the second illumination light. In particular, the described symmetrical arrangement can bring about a symmetrical angular distribution around the optical axis.

The predetermined number can depend on the specific grid structure. Specifically, the predetermined number can depend on whether the unit grid cell is a pure square (all grid points are located at one corner of a square) or a square of adjacent grid points with a face-centred central grid point.

For a square with a face-centred central grid point, there are exactly four closest adjacent grid points for the central grid point. In this case, four closest adjacent second light sources can be assigned to a central first light source for each individual lens. The predetermined number in this case is four. For a pure square (without a face-centred central grid point), there are four closest second light sources for a first light source. Furthermore, as described above, there are four further adjacent grid points that are a little further apart from the central grid point, exactly by the root of two. In this case, the predetermined number may be four or eight.

According to a further embodiment of the invention the real positions of at least some of the second light sources are spatially shifted relative to the respective further grid point. A corresponding spatial offset can be at least a factor of 5, and preferably a factor of 10, smaller than the distance between two immediately adjacent grid points.

The described spatial offset, which may be disadvantageous for purely geometrical optical reasons, has the advantage that the first light sources and second light sources can also be arranged close to one another (and thus contribute to a small size of the camera) if the light sources are particularly bright (red) LEDs, which are not pure SMD components and which must be bonded for electrical contact. The spatial offset described allows the space required for bonding (for bond pads) to be created between the LEDs. The first light sources and/or the second light sources therefore do not necessarily have to be implemented with SMD LEDs, which often have a lower luminous intensity compared to "bond LEDs".

According to a further embodiment of the invention the illumination device furthermore has an (inner) mirrored border which laterally at least partially surrounds the lens array and/or an intermediate space between (i) the first light sources and the second light sources and (ii) the lens array. The described (inner) mirrored border can advantageously contribute to ensuring that as little illumination light as possible and in particular as little second illumination light as possible is lost for the brightest possible illumination.

According to a further embodiment of the invention the first illumination angle includes an angle of 0 degrees and/or the second illumination angle is in a range of 20 to 40 degrees and preferably in a range of 25 to 35 degrees. It is further preferable if the second illumination angle can be at least close to 30 degrees. As already described above, in particular the second illumination light can comprise a larger angular range, for example from 25° to 35°, from 20° to 40° or from (asymmetrically to 30°) from 10° to 40°.

According to a further embodiment of the invention, the camera further on a beam splitter, which is arranged (i) in an optical illumination path of the first illumination light (and the second illumination light) between the lens array and the object plane and (ii) in an optical measuring path of a measuring light between the object plane and the camera sensor, wherein the measuring light is created by a (back) scattering of the first illumination light and/or the second illumination light on the object.

The beam splitter described thus ensures spatial separation of the measuring light from the first illumination light and/or the second illumination light in partial areas of the two optical paths. This means that images of the object can also be captured by the camera sensor when the first illumination angle is exactly 0°. This means that a high level of detection accuracy can also be achieved for smaller structures of the object in question.

According to a further embodiment of the invention the beam splitter is arranged spatially along a straight connecting line between the lens array and the object plane, so that the first illumination light and the second illumination light penetrate the beam splitter in transmission and the measuring light emitted by the object hits the camera sensor after reflection. This has the advantage that in a camera system described below, which has (at least) two of the cameras described here, the first light sources and the second light sources of both cameras can be mounted on a common (flat) circuit board. The same applies to the two lens arrays of the two cameras.

However, it should be noted that there are also embodiments of the camera described in this document in which the beam splitter is spatially arranged along a straight connecting line between the object plane and the camera sensor. In this case, in a camera system with (at least) two cameras arranged next to one another, the two camera sensors can be mounted on a common (flat) circuit board.

According to a further embodiment of the invention the beam splitter is a beam splitter cube that is configured and arranged in relation to the two illumination structures and the lens array in such a way that a portion of the second illumination light experiences complete reflection on an inner side wall of the beam splitter cube, wherein the completely reflective inner side wall faces the camera sensor.

The complete reflection described can advantageously contribute to (i) expanding the angular range or the angular spectrum of the second illumination light and (ii) making the illumination particularly homogeneous, in particular due to the second illumination light. In addition, (iii) no light rays of the second illumination light that strike flatly on the completely reflective inner side wall are lost for bright illumination of the object. At the same time, the complete reflection can reliably prevent any particularly oblique light rays of the second illumination light from being detected by the camera sensor.

To put it clearly, the beam splitter cube has the function of a light guide in relation to the completely reflective inner side wall, which ensures a low loss, in particular of second illumination light.

According to a further embodiment of the invention a further part of the second illumination light has a complete reflection on a further inner side wall of the beam splitter cube, wherein the completely reflecting further inner side wall faces away from the camera sensor. The completely reflective further inner side wall can also contribute to the second illumination light striking the object having a high angular range, a high intensity and a high homogeneity with respect to the local light intensity.

The completely reflective additional inner side wall facing away from the camera sensor can also ensure that the portion of (first and second) illumination light which is coupled out of the illumination path by the beam splitter and hits the completely reflective additional inner side wall at a very steep angle, leaves the beam splitter and does not accidentally hit the camera sensor. An undesirable re-entry of this decoupled (first and second) illumination light can be efficiently prevented by placing a light absorber "behind" the completely reflecting further inner side wall and thus outside the beam splitter cube.

According to a further embodiment of the invention the beam splitter cube has at least one reflective side wall, which is mirrored on the outer side of the beam splitter cube.

The reflective side wall described can also contribute to the second illumination light in particular having a high angular range, a high intensity and a high homogeneity in relation to the local light intensity in the area of the object.

The beam splitter cube preferably has a further reflective side wall which is opposite the reflective side wall. This can have the same technical advantage as the reflective side wall.

In the embodiments described above, in which the beam splitter is spatially arranged along a straight connecting line between the lens array and the object plane, the four side walls mentioned are lateral side walls with respect to the illumination path. This means that the two front side walls, which face the lens array or the object plane, are neither completely reflective (this is not possible due to the steep angle of incidence of the first and second illumination light) nor mirrored. The illumination light should pass through these two side walls as far as possible without light entry or exit losses.

Of the four lateral side walls, two side walls are preferably completely reflective and the other two side walls are (completely) reflective due to an external mirror coating.

Side walls mirrored on the outer side can advantageously be used for mechanical attachment of the beam splitter cube to a chassis of the camera and/or indirectly to the circuit board described above for the first and second light sources. Such a mechanical fastening can then be realised by suitable bonding without impairing the optical function of the beam splitter cube.

According to a further embodiment of the invention the illumination device further includes a third illumination structure having a plurality of third light sources for illuminating the object with a third illumination light at a third illumination angle that is flatter compared to both the first illumination angle and the second illumination angle. Furthermore, the illumination device has an optical collimation arrangement for collimating the third illumination light.

The third illumination structure described in conjunction with the optical collimation arrangement has the advantage that an object can also be illuminated with a further and particularly flat illumination light. This allows an even more reliable, correct optical detection of the object in question to be achieved. In addition, several optical properties of the object can be reliably recognized as part of an image evaluation using a data processing device connected downstream of the camera sensor.

According to a further embodiment of the invention the optical collimation arrangement has at least one refractive optical component and/or at least one reflective optical component. Through a suitable optical design of the component(s) described, a high degree of homogeneity in relation to the local illumination level can also be advantageously achieved for the flat third illumination.

The optical collimation arrangement preferably has both at least one refractive optical component and at least one reflective optical component. As a result, good collimation with low light loss can be achieved for different designs of the illumination device.

The refractive optical component can be, for example, a cylindrical lens. The cylindrical lens can be an elongated cylindrical lens which is assigned to a plurality of third light sources, which are preferably arranged next to one another in a row along a linear direction. The reflective optical component can be, for example, a concave mirror that has a constant curvature along a longitudinal direction and can also collimate the third illumination light from a plurality of third light sources that are arranged along a linear direction.

Of course, a separate refractive optical component and/or a separate reflective optical component can also be used for each third light source. As a result, the optical collimation arrangement can be adapted even more precisely to the specific design of the illumination device or the entire camera and optimized with regard to light intensity, angular range and homogeneity.

In some embodiments, the at least one refractive optical component is a free-form lens. Alternatively or in combination, the at least one reflective optical component is a free-form mirror. By appropriately shaping the free form (in each case), the illumination by the third illumination light can be further improved.

According to a further embodiment of the invention the object plane is spatially distanced along a section of the illumination path of the beam splitter. Furthermore, the optical collimation arrangement is arranged around an installation space, which results from the distancing between the object plane and the beam splitter. This advantageously enables a simple "coupling" of the third illumination light directed at the object at a flat angle.

According to a further embodiment of the invention the illumination device also has a further (inner) mirrored border, which at least partially laterally surrounds the installation space. This has the advantage that the first illumination light emerging from the beam splitter and in particular the second illumination light emerging from the beam splitter cannot exit laterally or can only exit to a very small extent. This prevents in a simple and effective manner that in particular as little as possible second illumination light is lost in order to achieve the brightest possible illumination. In addition, the homogeneity of the illumination light is further improved.

In this context, the term "lateral" is understood to mean, in particular, a spatial area that is distanced from the optical axis of the illumination path perpendicular to the section of the illumination path between the object plane and the beam splitter. This distancing should be so large that no light rays from the first and/or second illumination light run outside or next to the further (inner) mirrored border and are therefore lost in the illumination of the object.

The expression "at least partially surrounded" in this context can be understood to mean that the mirroring is not complete due to the further border along a direction parallel to the optical axis of the illumination path. Alternatively or in combination, it can be understood that the mirroring is not complete along the optical axis of the illumination path. An area free of mirroring along the optical axis of the illumination path can be used to allow third illumination light from the outside to hit the object plane at a flat angle.

According to a further aspect of the invention, a camera system is described which has two cameras of the type described above, wherein the two cameras are attached to one another in a spatially fixed manner on a common carrier structure.

The camera system described is based on the knowledge that two objects can be optically detected at the same time, as long as the distance between the two objects is exactly large enough that both objects can be positioned in one of the two object detection areas. This is the case, for example, with a so-called turret placement head, which has (a) a first plurality of first assembly part holding devices arranged on a first circular ring carrier and (b) a second plurality of second assembly part holding devices arranged on a second circular ring carrier, wherein an assembly part holding device is configured for temporarily holding an electronic assembly part corresponding to an object and the two circular ring carriers are rotatable about a common axis of rotation. Such a turret placement head is described in detail, for example, in the issued German patent DE 10 2020 116385 B3.

The common carrier structure can also be a common chassis for both cameras.

According to an exemplary embodiment of the invention, the camera system also has a light absorber which is arranged between the two cameras. The light absorber can effectively help to reliably prevent "crosstalk" between both cameras. This can apply not only to light rays from the various "illumination lights" but also to measuring light. This means that with the camera system described, an optical detection of two assembly parts can be realised in which there is no interference between the two cameras.

In embodiments in which the two cameras each have a beam splitter, wherein both beam splitters are arranged next to one another, the light absorber can in particular contribute to the absorption of light rays of the respective first illumination light and/or second illumination light, which reach, without scattering, the respective object or assembly part in the respective camera sensor.

According to a further embodiment of the invention the first light sources and the second light sources of the first camera and the first light sources and the second light sources of the second camera are arranged in a common (focal) plane and in particular on a common circuit board. This advantageously simplifies the manufacturing process for the camera system described.

According to a further aspect of the invention, a placement head is described for placing assembly part carriers. The placement head described has (a) a chassis; (b) at least one component holding device attached to the chassis for temporarily holding an electronic assembly part; (c) a chassis-mounted camera of the type described above and/or a chassis-mounted camera system of the type described above.

The placement head described is based on the knowledge that the camera described above and/or the camera system described above can be used to detect electronic assembly parts due to advantageous optical properties such as, in particular, a high intensity and/or a high homogeneity of the, in particular, first and second illumination light with a very short exposure time. Due to the possibility of a particularly compact implementation of the camera/camera system described above, the entire placement head can also be implemented in a compact manner. In particular, however, the installation space of the placement head, which must be reserved for the camera or the camera system, is comparatively small, so that more installation space "remains" or is available for the actual mechanical tasks of the placement head, i.e. picking up electronic assembly parts and placing picked-up assembly parts on a respective assembly part carrier. This can have a positive effect on the assembly performance, i.e. on the number of electronic assembly parts that can be picked up and placed within a certain period of time.

According to a further aspect of the invention, an automated placement machine is described for automatically placing electronic assembly parts on an assembly part carrier. The automated placement machine described has (a) a frame structure; (b) a transport device attached to the frame structure for supplying an assembly part carrier to be equipped into an placement area and for removing an at least partially equipped assembly part carrier from the placement area; (c) a positioning system having at least one stationary component attached in a stationary manner to the frame structure and a movable component which can be positioned relative to the stationary component; (d) a placement head of the type described above, wherein the placement head is attached to the movable component and is configured to pick up assembly parts and, after a suitable positioning of the movable component, to equip the assembly part carrier with the assembly parts, wherein each assembly part is mounted on the assembly part carrier at a predetermined placement position.

The automated placement machine described here is based on the knowledge that a high placement performance can be achieved with the placement head described above. This is not only due to the fact that the camera(s) of the placement head can be made very compact. A particularly low weight of the camera(s) can also contribute to increasing the placement performance. With a reduced weight of the camera(s) and thus also of the placement head, only a comparatively small (inert) mass has to be moved back and forth by the gantry system during the placement operation.

Further advantages and features of the present invention arise from the following exemplary description of currently preferable embodiments.

DETAILED DESCRIPTION

Figure 1:
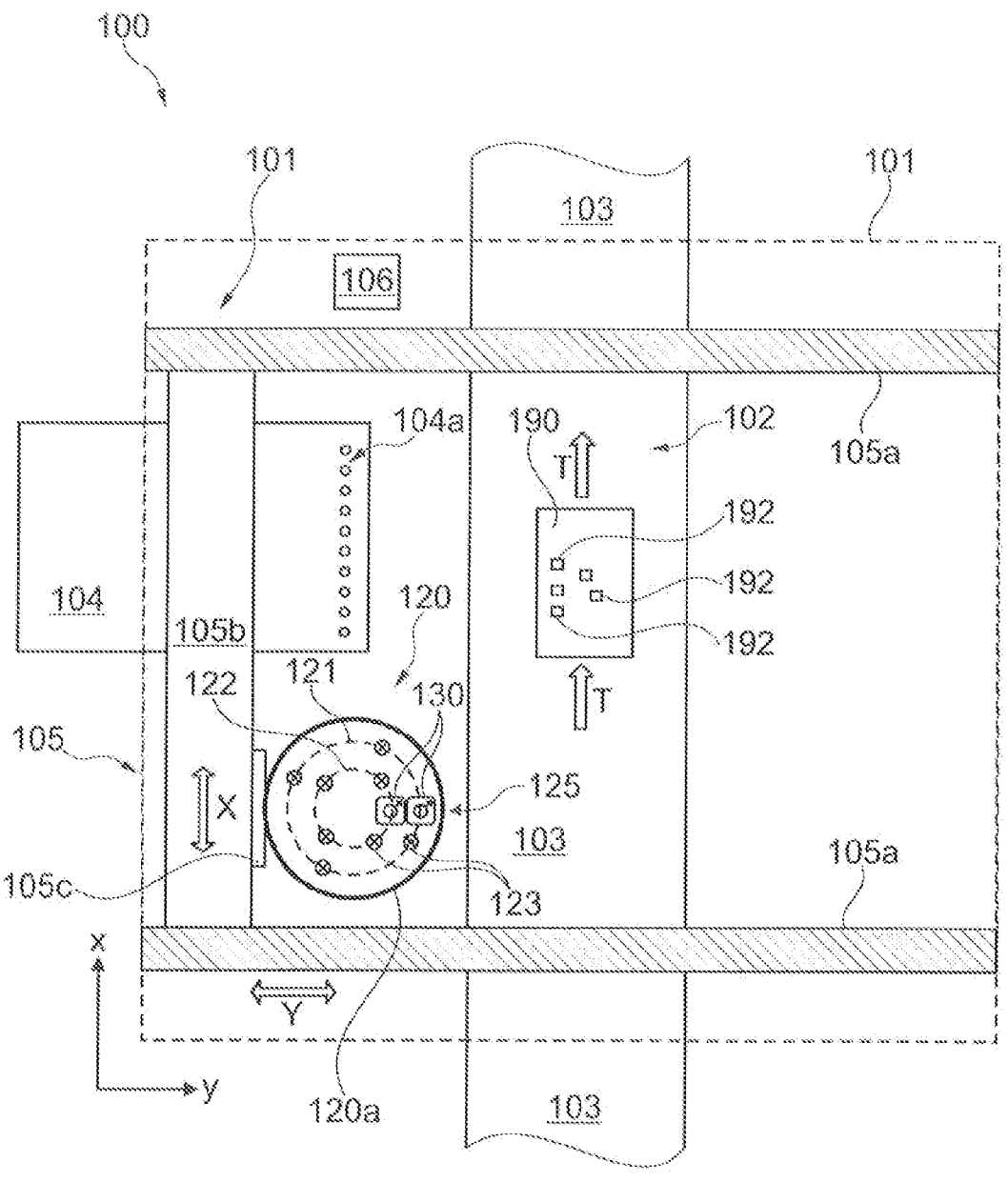
FIG. 1 shows an automated placement machine according to an exemplary embodiment of the invention.

It should be noted that, in the following detailed description, features or components of different embodiments that are identical or at least functionally identical to the corresponding features or components of another embodiment are provided with the same reference numerals or with reference numerals that are identical in the last two digits of the reference symbols of corresponding identical or at least functionally identical features or components. To avoid unnecessary repetitions, features or components that have already been explained on the basis of a previously described embodiment are no longer explained in detail at subsequent points.

Furthermore, it is noted that the following described embodiments only represent a limited selection of possible variations of embodiments of the invention. In particular, it is possible to combine the features of individual embodiments in a suitable manner, such that a multitude of different embodiments can be viewed as obviously disclosed for the person skilled in the art with the embodiments explicitly described here.

It is also noted that spatial terms such as "front" and "back", "top" and "bottom", "left" and "right", etc. are used to describe the relationship of one element to another element or to describe other elements as illustrated in the figures. Accordingly, the spatial terms may apply to orientations that differ from the orientations shown in the figures. It is to be understood, however, that all such spatial terms refer to the orientations shown in the drawings for convenience of description and are not necessarily limiting, since the device, component, etc. shown in each case assume orientations which, when in use, may differ from the orientations shown in the drawing.

FIG. 1 shows a schematic representation of an automated placement machine 100 for equipping assembly part carriers or circuit boards 190 with electrical assembly parts 192. The automated placement machine 100 has a frame structure 101. Two stationary carrier rails 105a are attached to the frame structure 101 and each extend along a Y-direction. The two carrier rails 105a are part of a positioning system 105 and are referred to in this document as stationary components 105a.

A movable carrier arm 105b is attached to the two stationary components 105a, which extends along an X-direction. In the context of the technology described herein, the movable carrier arm is referred to as a movable component 105b. The movable carrier arm 105b can be moved along the Y-direction, driven by drive motors (not shown) in the form of linear motors. The corresponding direction of travel is marked with a double arrow "Y".

A mounting component 105c is attached to the movable component 105b, which can be, for example, a carriage that is held on a linear guide (not shown) of the movable component 105b and can be moved along the X-direction by means of a further linear motor (also not shown). The corresponding direction of travel is marked with a double arrow "X". The placement head 120 is attached to the mounting component 105c in a known manner.

The two stationary components 105a, the movable component 105b and the mounting component 105c, together with the linear motors and linear guides (also not shown in FIG. 1) represent the positioning system 105 with which the placement head 120 can be moved or positioned within the XY plane.

The placement of the assembly part carriers 190 is carried out in a placement area 102 of the automated placement machine 100. Before placement, the assembly part carrier 190 to be equipped is transported into the placement area 102 by means of a transport device 103, for example a conveyor belt. After being at least partially equipped with assembly parts 192, the assembly part carrier 190 is transported away by means of the transport device 103. The corresponding transport directions are each marked with an arrow T in FIG. 1.

As already mentioned above, the placement head 120 is attached to the mounting component 105c. The placement head 120 can be moved between assembly part pick-up positions 104a of an assembly part supplying system 104 and the placement area 102 by suitably controlling the linear motors (not shown). A data processing device 106, which controls the placement process, is communicatively coupled to the various linear motors and the placement head 120 via data lines (not shown). During a placement process, the placement head 120 moves to the assembly part pick-up positions 104a, where assembly parts 192 are picked up. The placement head 120 is then moved together with the picked-up assembly parts 192 into the placement area 102, where the assembly parts 192 are placed on the provided assembly part carrier 190. After that, the "empty" placement head 120 is moved to the supplying system 104, where assembly parts 192 are picked up again.

According to the exemplary embodiment shown here, the placement head 120 is a so-called double turret head, which has a chassis 120a and two circular ring carriers, a first circular ring carrier 121 and a second circular ring carrier 122. The two rotor assemblies are arranged concentrically to one another and are rotatable about an axis of rotation (not shown). Several assembly part holding devices 123 are attached to both circular ring carriers 121, 122, with which an electronic assembly part 192 can be picked up or held. The assembly part holding devices 123 can be moved along their longitudinal axis, i.e. perpendicular to the plane of the drawing, by means of a linear drive (not shown). As a result, in a known manner, the entire placement head 120 does not have to be moved in the vertical direction, i.e. perpendicular to the plane of the drawing, neither when picking up an assembly part 192 nor when placing an assembly part 192 on the assembly part carrier 190. Further details on the mechanical structure of the placement head can be found in the issued German patent DE 10 2020 116385 B3.

Held assembly parts 192, which are located on the lower end face of the respective assembly part holding device 123, are not shown in FIG. 1 for reasons of clarity.

The placement head 120 also has a camera system 125, which includes two cameras 130 according to the exemplary embodiment shown here. One of the two cameras 130 is assigned to the first circular ring carrier 121 and is used to measure assembly parts 192, which are held by the assembly part holding devices 123 of the first circular ring carrier 121.

The other of the two cameras 130 is assigned to the second circular ring carrier 122 and is used to measure assembly parts 192 that are held by the assembly part holding devices 123 of the second circular ring carrier 122. When measuring assembly parts, for example, the exact angular position of a captured or held assembly part 192 can be measured. In addition, the exact position of the captured or held assembly part 192 (in relation to the respective assembly part holding device 123) can also be determined. When the relevant assembly part 192 is placed, a deviation in the angular position can then be compensated in a known manner (i) by a suitable rotation of the relevant assembly part holding device 123 and (ii) by a suitable positioning of the entire placement head 120, a positional deviation of the assembly part 192 can be compensated in a suitable manner so that the assembly part 192 in question is placed on the assembly part carrier 190 in a correct angular position exactly at the intended placement position.

Figures 2, 3:
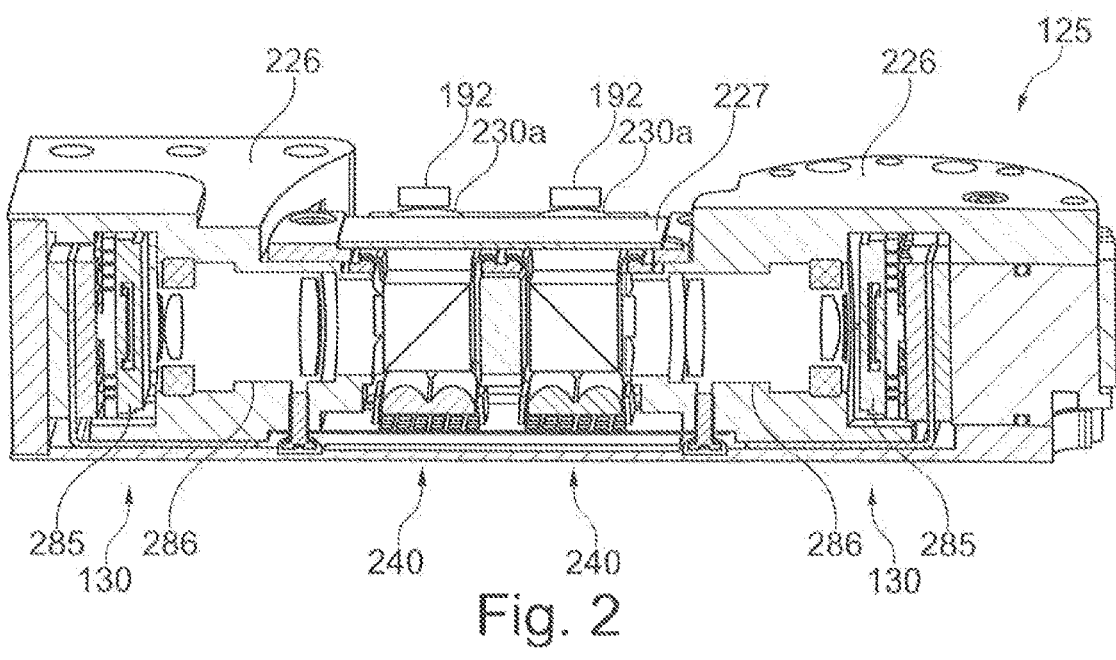
FIG. 2 shows a perspective view of a camera system with two cameras for optically detecting one assembly part in each case, which are attached to a common carrier structure at a fixed distance from one another.
FIG. 3 shows a cross-sectional view of the illumination devices of the two cameras.

FIG. 2 shows a perspective view of a camera system 125 with two cameras 130 for optically detecting an assembly part 192, which is located in an object plane 230a of the respective camera 130. The two cameras 130 have a common carrier structure 226 and are arranged at a fixed spatial distance from one another. In embodiments not shown, the distance between the two cameras 130 is variable.

The two cameras 130 are constructed identically, at least with regard to their essential optical properties. Therefore, when we talk about "the camera" in the following, the other camera 130 is also meant.

The camera 130 has an illumination device 240 which illuminates the assembly part 192 in question from below. As will be described in more detail below, this illumination is carried out with different illumination structures and each with a different illumination angle, (i) a first illumination light incident perpendicularly onto the assembly part 192, (ii) a second illumination light incident on the assembly part 192 at a steep oblique angle and (iii) a third illumination light incident on the assembly part 192 at a shallow oblique angle. The vertically incident first illumination light and the steeply incident second illumination light reach the assembly part in transmission through a beam splitter.

The camera 130 also has a camera sensor 285 for capturing an image of the assembly part 192 illuminated by the illumination device 240. The corresponding measuring light, which is essentially illumination light backscattered by the assembly part 192, reaches the camera sensor 285 through a reflection in or on the beam splitter. Camera optics 286, which are optically connected upstream of the camera sensor 285, ensure a suitable optical image of the assembly part 192 on the camera sensor 285. The camera optics 286, which according to the exemplary embodiment shown here is a lens system with a plurality of lenses, is configured in such a way that the distance between the beam splitter and the camera sensor 285 is as small as possible. The camera 130 and thus also the entire camera system 125 can thus be implemented along the optical axis of the camera sensor 285 in a spatially compact design.

A transparent cover plate 227 closes the entire optical system of the two cameras 130 from above. This ensures that dust and dirt neither negatively affect the illumination of the assembly part 192 nor the image of the assembly part 192 on the camera sensor 285.

FIG. 3 shows a cross-sectional view of the two illumination devices 240 of the two cameras 130. One of the two illumination devices 240 is assigned to one of the two cameras 130 and the other of the two illumination devices 240 is assigned to the other of the two cameras 130.

Just like the two cameras 130, the two illumination devices 240 are also constructed identically, at least with regard to their essential optical properties. Therefore, when we talk about "the illumination device" in the following, the other illumination device 240 is also meant.

The illumination device 240 comprises a first illumination structure 350 with a plurality of first light sources 351 for illuminating the relevant assembly part 192 with a first illumination light 352 at a first illumination angle, which according to the exemplary embodiment shown here is a vertical illumination angle. This means that in FIG. 3 the first illumination light 352 hits the assembly part 192 vertically from below. The illumination device 240 further comprises a second illumination structure 360 with a plurality of second light sources 361 for illuminating the assembly part 192 with a second illumination light 362 at a second illumination angle. The second illumination angle is a steep oblique angle with respect to a flat underside of the assembly part 192, for example at 30° in relation to a surface normal of the underside of the assembly part 192. The second illumination angle preferably comprises a relatively wide angular spectrum or a relatively wide angular distribution of, for example, 10°, 20° or even 30° around a central second illumination angle.

According to the exemplary embodiment shown here, all first light sources 351 and all second light sources 361 are light-emitting diodes. These are mounted on a common circuit board 364 and are electrically contacted, with the common circuit board 364 carrying not only the first light-emitting diodes 351 of the first illumination structure 350 but also the second light-emitting diodes 361 of the second illumination structure 360.

The illumination device 240 further includes an optical lens array 354 with a plurality of individual lenses 355 for collimating both the first illumination light 352 and for collimating the second illumination light 362. Each individual lens 355 is assigned to exactly one first light source 351 and each individual lens 355 is assigned at least two second light sources 361. The first light sources 351 and the second light sources 361 mounted on the common circuit board 364 are all located in a common focal plane 364a of the optical lens array 354.

According to the exemplary embodiment described here, as described below with reference to FIG. 4 and in particular with reference to FIG. 5, in addition to a single first light source 351, exactly eight second light sources 361 are each assigned to an individual lens 355. The eight second light sources 361 are arranged around the one first light source 351. Furthermore, according to the exemplary embodiment shown here, the lens array 354 (for each illumination device 240) has exactly four individual lenses 355 in a square arrangement, with only a maximum of two individual lenses 355 being shown in the figures for reasons of clarity.

With respect to an optical axis 355a of the respective individual lens 355, the first light source is located at least approximately on this optical axis 355a. The second light sources 361 are, as already mentioned above, arranged around the first light source 351. The individual lens 355 is configured and arranged in such a way relative to the light sources 351, 361 assigned to it that both the first illumination light 352 and the second illumination light 362 are collimated.

Due to the arrangement of the first light source 351 on the optical axis 355a, the entirety of the light rays of the first illumination light 352 is symmetrical about the optical axis 355a. Selected illumination beams of the first illumination light 352 are shown in FIG. 3 in the illumination device 240 shown on the left. During transmission, the first illumination light 352 penetrates a beam splitter cube 365 as already mentioned above in the description of FIG. 2 and hits an underside of the assembly part 192, which is located in the object plane 230, exactly from below.

The first illumination light 352 scattered on the assembly part 192 enters the beam splitter cube 365 in a manner not shown but in an obvious manner and, after a 90° reflection through the beam splitter cube 365, hits the camera sensor 285 shown schematically in FIG. 3.

Due to the second light sources 361 being arranged offset with respect to the optical axis, the light rays of the second illumination light 362 for each second light source 361 are oblique light rays. Selected illumination beams of the second illumination light 362 from two different second light sources 361 are shown in FIG. 3 in the illumination device 240 shown on the right. In this context it can be seen that some particularly oblique light rays hit an inner side wall of the beam splitter cube 365. In order to minimize a loss of second illumination light 362 and thus to ensure the brightest and most homogeneous illumination of the assembly part 192, according to the exemplary embodiment shown here, the optical system consists of the second light sources 361, the optical lens array 354 and the beam splitter cube 365 configured so that complete reflection takes place on two opposite inner side walls, a (first) inner side wall 365a and a second inner side wall 365b, for the oblique light rays of the second illumination light 362. The inner side wall 365a, which faces the camera sensor 285, reflects the second illumination light 362 due to the very flat angle of incidence. At the same time, after reflection in the beam splitter cube 365, the measuring light hits the inner side wall 365a at a very steep angle and can (without complete reflection) penetrate the relevant side wall of the beam splitter cube 365 and hit the camera sensor 285.

In a corresponding manner, the second illumination light 362, which strikes the further inner side wall 365b, is also completely reflected. At the same time, the portion of the light which is emitted by the second light sources 361 and which is reflected in the beam splitter cube 365 penetrates the further inner side wall 365b and hits a light absorber 342 which is arranged between the two illumination devices 240. The light absorber 342 then ensures that this light can no longer hit the camera sensor 285.

The illumination device 240 also has a third illumination structure 370. The third illumination structure 370 has a plurality of third light sources 371 for illuminating the assembly part 192 with a third illumination light 372 at a third illumination angle that is significantly flatter compared to both the first illumination angle and the second illumination angle. The light rays of the third illumination light 372 are shown in the left illumination device 240 in FIG. 3. According to the exemplary embodiment shown here, all third light sources 371 (from both illumination devices 240) are located on a further common circuit board 376. This common additional circuit board 376, like the common circuit board 364 for the first light sources 351n and for the second light sources 361, also facilitates the assembly of the camera system 125 described and can also contribute to a high optical imaging quality, wherein the high optical imaging quality can be combined with a high spatial placement accuracy of a variety of light sources 351, 361, 371 designed as light-emitting diodes.

The third illumination structure 370 further includes an optical collimation arrangement for collimating the third illumination light 372. Details of the third illumination structure 370 are described below with reference to FIG. 4.

Figure 4:
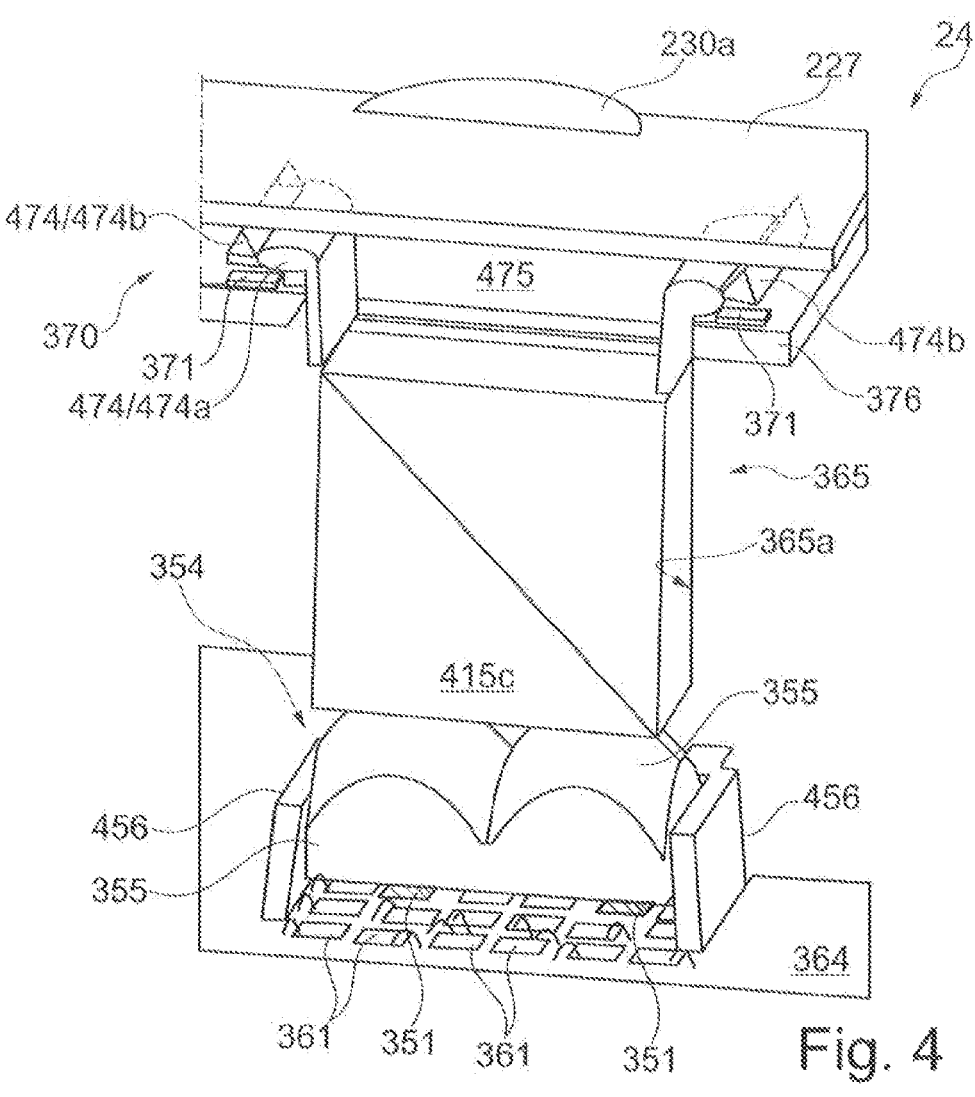
FIG. 4 shows an enlarged perspective view of the illumination device for a camera.

FIG. 4 shows an enlarged perspective view of the illumination device 240 for one of the two cameras 130. For reasons of clarity, FIG. 4 is a sectional representation, wherein the selected section is chosen as exactly between the two individual lenses 355 and parallel to the optical axes (not shown) of all the individual lenses 355.

The first light sources 351 and the second light sources 361 are arranged on the common circuit board 364 shown below. Only two of the first light sources 351 can be seen in FIG. 4. Even of the second light sources 361 surrounding a first light source 351, not all second light sources 361 can be seen in the perspective view of FIG. 4.

Around the lens array 354 there is a mirrored arrangement 456, which is also referred to as a mirror shaft in this document. The mirror shaft 456 also surrounds a gap which extends along the optical axes of the individual lenses 355 between the first light sources 351 and the second light sources 361 on one side and the underside of the beam splitter cube 365 on the other side. The mirror shaft 456 ensures that as little illumination light as possible, in particular second illumination light 362 from the second light sources 361, is lost laterally.

Above the lens array 354 is the beam splitter cube 365 which has been explained in detail above. For reasons of clarity, the camera sensor 285, which is located on the right side of the beam splitter cube 365, is not shown in FIG. 4. The rear part of the beam splitter cube 365 shown in FIG. 4 has a reflective side wall 365c on its back, which also contributes to reducing loss, in particular of the second illumination light 362. The front part of the beam splitter cube 365, not shown in the sectional view of FIG. 4, also has a reflective side wall on its front side, which also serves to reduce loss of (second) illumination light 362. The mirroring side walls can also be used to directly or indirectly attach the beam splitter cube 365, for example, to the common carrier structure 226. For this purpose, for example, an adhesive can be used, which is attached to the outer side of at least one of the two mirroring side walls and mechanically connects the beam splitter cube 365 to a suitable holding structure (not shown in detail).

As can be seen from FIG. 4, there is a further gap (along the optical axes of the individual lenses 355) between the top of the beam splitter cube 365 and the underside of the cover plate 227, which is surrounded by a further mirrored border 475, which is also referred to in this document as a further mirror shaft. The further mirror shaft 475 also serves to prevent or at least reduce unwanted lateral losses of the first illumination light 652 and in particular of the second illumination light 362.

However, as can be seen from FIG. 4, the mirrored border 475 does not extend directly below the cover plate 227. Rather, an optical collimation arrangement 474 is provided above the mirrored border 475 and, slightly spaced from the underside of the cover plate 227. The optical collimation arrangement 474 ensures that the third illumination light 372 (shown in FIG. 3), which is generated by the third illumination structure 370 or more precisely by the third light sources 371 of the third illumination structure 370, penetrates into the further gap at a very flat angle can and at this flat angle, possibly with a suitable angular distribution, hits the assembly part 192 (not shown in FIG. 5) laterally from below. The third light sources 371 are also preferably light-emitting diodes.

According to the exemplary embodiment shown here, the third light sources 371 (i) are mounted (and contacted) on the further common circuit board 376 in such a way that they surround the mirrored border 475. As can be seen from FIG.

4, the mirrored border 475 is located in a suitable recess in the further common circuit board 376.

The number of third light sources 371 can vary depending on the specific embodiment. The third illumination structure 370 should have at least two third light sources 371, which are arranged on two opposite sides of the mirrored border 475. However, there is preferably at least one third light source 371 on each of the four sides of the mirrored border 475 shown in FIG. 4. More preferably, several third light sources 371 are arranged on each side of the mirrored border 475 in sequence and at a short distance from one another.

According to the exemplary embodiment shown here, the optical collimation arrangement 474 has a plurality of optical components which are designed so that the third illumination light 372 also strikes the relevant assembly part 192 as homogeneously as possible, i.e. with a spatially constant intensity. Specifically, the optical collimation arrangement 474 includes in the exemplary embodiment shown here refractive optical components 474a and reflective optical components 474b. Since with the embodiment described here, the third light sources 371 are arranged along the four sides of the mirrored border 475, each with a small distancing. According to the exemplary embodiment shown here, the refractive optical component is a cylindrical lens 474a and the reflective optical component is a simply curved concave mirror 474b, which can also be referred to as a "cylindrical mirror". The reflective optical components 474b ensure that as much of the third illumination light 372 emitted by the third light sources 371 as possible is directed onto the refractive optical components 474a. In other words, a loss of illumination light is also reduced by the reflective optical components 474b.

As can be seen from FIG. 4, according to the exemplary embodiment shown here, the further mirror shaft 475 and at least the refractive optical components 474a and preferably also the reflective optical components 474b are formed in one piece as a so-called hybrid optics. Such an integral design makes it easier to assemble the illumination device 240 and thus the entire camera 130. On the other hand, the optical components 474a, 474b of the optical collimation arrangement 474 can be manufactured together with the further mirror shaft 475 with a high spatial and therefore also a high optical accuracy.

As described above, the third illumination light 372 should strike the assembly part 192 (not shown in FIG. 4) at a very flat angle. But this also means that the third illumination light 372 must pass through the cover plate 227 at a shallow angle, which is typically required to prevent dirt from entering the interior of the camera 130. In order to prevent undesirable complete reflection under these circumstances, at least the underside of the cover plate 227 is provided with a suitable anti-reflective coating. Furthermore, a so-called ESD coating ("electrostatic discharge" coating) can be provided on the top of the cover plate in order to prevent unwanted electrostatic charging of the cover plate 227.

According to the exemplary embodiment shown here, both the individual lenses 355 and the optical components of the optical collimation arrangement 474 are so-called free-form optics. This means that the (refractive) surfaces of the individual lenses are 355 aspherical surfaces. Furthermore, the refractive surfaces of the refractive optical components 474a and the reflective surfaces of the reflective optical components 474b deviate from a pure cylindrical shape. The open areas of all free-form optics are designed three-dimensionally in such a way that they each contribute to a homogeneous illumination of the assembly part 192 with a spatially constant light intensity. However, it should be noted that in other embodiments no free-form optics are used or only free-form optics are used for one or two illumination structures 350, 360, 370.

Figure 5:
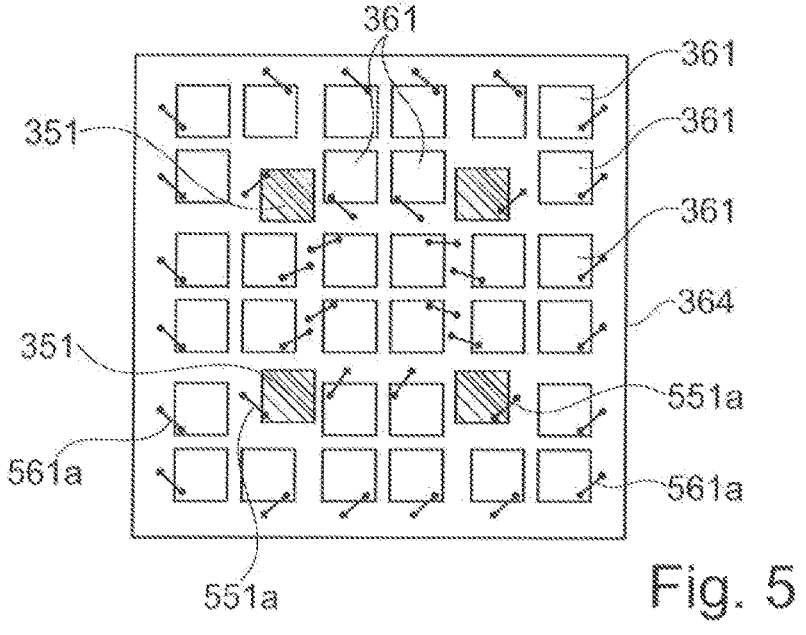
FIG. 5 shows light-emitting diodes mounted on a common circuit board, which represent the first light sources and the second light sources and which are each contacted by means of a bond wire, wherein some of the light-emitting diodes are offset from a respective grid point of a two-dimensional regular grid to create sufficient space for the bond wires.

FIG. 5 shows light-emitting diodes mounted on the common circuit board 364, which represent the first light sources 351 and the second light sources 361, respectively. The light-emitting diodes 351, 361 are so-called high-performance light-emitting diodes, which are electrically connected from below directly to the common circuit board 364 via a contact pad (not shown). At the top of the light-emitting diodes 351, 361, contact is made via a first bond wire 551a or via a second bond wire 561a. The ends of the bond wires 551a, 561a are electrically connected in a known manner to connection contacts (not shown in FIG. 5) on the top of the common circuit board 364. A certain amount of space on the circuit board 364 is required for these connections between bond wire 551a, 561a and circuit board 364. In order to create this space, according to the exemplary embodiment shown here, individual light-emitting diodes 351, 361 are slightly offset from an ideal grid point of a two-dimensional regular grid. The first light sources or light-emitting diodes 351 are preferably located exactly at the (optimal) grid location, which is defined by the optical axis of the respective individual lens or which lies exactly on this optical axis. The space required for bonding between individual light-emitting diodes 361, 361 is then created by moving at least some of the second light sources or light-emitting diodes 361. Although this deteriorates the optical image (only) for the second illumination light 352, this deterioration can be compensated for or even overcompensated by using particularly bright or powerful light-emitting diodes for the first light sources 351 and/or for the second light sources 361, which, at least currently, are only available as light-emitting diodes that have to be electrically contacted using a bond wire.

It is noted that the term "have" does not exclude other elements and that the word "one or a" does not exclude a plurality. Elements, which are described in connection with different exemplified embodiments, can also be combined. It should also be noted that reference signs in the claims should not be construed as limiting the scope of the claims.

REFERENCE SIGNS

100 Automated placement machine
101 Frame structure
102 Placement area
103 Transport device
104 Assembly part supplying system
104a Assembly part pick-up positions
105 Positioning system
105a Stationary components/Stationary carrier rails
105b Movable component/Movable carrier arm
105c Mounting component
106 Data processing device/Control device
120 Placement head
120a Chassis
121 First circular ring carrier
122 Second circular ring carrier
123 Assembly part holding device
125 Camera system
130 Camera
190 Assembly part carrier/Circuit board
192 Electronic assembly part/Object
T Transport direction
226 Carrier structure 227 Cover plate
230a Object plane
240 Illumination device
285 Camera sensor
286 Camera optics
342 Light absorber
350 First illumination structure
351 First light sources
352 First illumination light
354 Lens array
355 Individual lens
355a Optical axis
360 Second illumination structure
361 Second light sources
362 Second illumination light
364 Common circuit board
364a Common focal plane
365 Beam splitter cube
365a (First) inner side wall (for complete reflection)
365b Further inner side wall (for complete reflection)
370 Third illumination structure
371 Third light sources
372 Third illumination light
376 Further common circuit board
456 Mirrored border/mirror shaft
465c Reflective sidewall
474 Optical collimation arrangement
474a Refractive optical component/(Free-form) cylinder lens
474b Reflective optical component/Single curved (free-form) concave mirror
475 Further mirrored border/Further mirror shaft
551a First bond wires
561a Second bond wires

The invention claimed is:

1. A camera for optically detecting objects, the camera comprising an illumination device for illuminating an object which is located in an object plane of the camera;
  a camera sensor for capturing an image of the object illuminated by the illumination device;
  a cover plate closing the entire camera from above,
    wherein the illumination device has a first illumination structure having a plurality of first light sources for illuminating the object with a first illumination light at a first illumination angle; a second illumination structure having a plurality of second light sources for illuminating the object with a second illumination light at a second illumination angle which differs from the first illumination angle; and an optical lens array having a plurality of individual lenses to collimate the first illumination light and to collimate the second illumination light;
  a third illumination structure having a plurality of third light sources for illuminating the object with a third illumination light at a third illumination angle, which is flatter compared to both the first illumination angle and the second illumination angle; and
    wherein each individual lens is assigned at least one first light source; each individual lens is assigned at least two second light sources; and
  the third light sources are arranged at a circuit board positioned between the cover plate and the optical lens array.

2. The camera according to claim 1, wherein with respect to an optical axis of the respective individual lens, the at least one assigned first light source is arranged closer to the optical axis than the at least two assigned second light sources.

3. The camera according to claim 1, wherein each individual lens is assigned exactly one first light source.

4. The camera according to claim 1, wherein at least one individual lens is an aspherical lens.

5. The camera according to claim 1, wherein the first light sources and the second light sources are arranged in a common focal plane of all individual lenses.

6. The camera according to claim 1, wherein the first light sources and the second light sources are arranged on a common circuit board and electrically connected.

7. The camera according to claim 6, wherein the lens array is mounted directly or indirectly on the common circuit board.

8. The camera according to claim 1, wherein the first light sources are each arranged at a grid point of a two-dimensional regular grid and the second light sources are each arranged at least approximately at a further grid point of the two-dimensional regular grid, wherein the first light sources and the second light sources are arranged on a common plane.

9. The camera according to claim 8, wherein the real positions of at least some of the second light sources are spatially shifted relative to the respective further grid point.

10. The camera according to claim 8, wherein a grid point of one of the at least one first light sources is a central grid point which is on the optical axis of that individual lens which is assigned the relevant first light source, and the further grid points of the second light sources are each an adjacent grid point, wherein in the regular grid there are a predetermined number of adjacent grid points for each central grid point, which are arranged symmetrically to one another around the central grid point.

11. The camera according to claim 1, wherein the illumination device further comprises a mirrored border, which laterally at least partially surrounds the lens array and/or an intermediate space between (i) the first light sources and the second light sources and (ii) the lens array.

12. The camera according to claim 1, wherein the first illumination angle comprises an angle of 0 degrees and/or wherein the second illumination angle is in a range of 20 to 40 degrees or in a range of 25 to 35 degrees.

13. The camera according to claim 1, further comprising a beam splitter, which is arranged (i) in an optical illumination path of the first illumination light between the lens array and the object plane, and (ii) in an optical measuring path of a measuring light between the object plane and the camera sensor, wherein the measuring light is caused by a scattering of the first illumination light and/or the second illumination light on the object.

14. The camera according to claim 13, wherein the beam splitter is a beam splitter cube which is configured in such a way in relation to the two illumination structures and the lens array is arranged in such a way that part of the second illumination light undergoes a complete reflection on an inner side wall of the beam splitter cube, wherein the completely reflective inner side wall faces the camera sensor.

15. The camera according to claim 14, wherein the beam splitter cube has at least one reflective side wall which is mirrored on the outer side of the beam splitter cube.

16. The camera according to claim 14, wherein a further part of the second illumination light undergoes a complete reflection on a further inner side wall of the beam splitter cube, wherein the completely reflective further inner side wall faces away from the camera sensor.

17. The camera according to claim 1, wherein the illumination device further comprises an optical collimation arrangement for collimating the third illumination light.

18. The camera according to claim 17, wherein the object plane is spatially distanced along a section of the beam splitter's illumination path, and the optical collimation arrangement is arranged around an installation space, which results from the distancing between the object plane and beam splitter.

19. A camera system having two cameras according to claim 1, wherein the two cameras are attached to one another in a spatially fixed manner on a common carrier structure.

20. The camera system according to claim 19, further comprising a light absorber (342) arranged between the two cameras.

21. The camera system according to claim 19, wherein the first light sources and the second light sources of the first camera and the first light sources and the second light sources of the second camera are arranged in a common focal plane and in particular on a common circuit board.

22. A placement head for equipping assembly part carriers, the placement head comprising a chassis;

at least one assembly part holding device attached to the chassis for temporarily picking up an electronic assembly part;

a camera attached to the chassis according to claim 1.

23. An automated placement machine for placing electronic assembly parts on an assembly part carrier (190), the automated placement machine comprising a frame structure;

a transport device attached to the frame structure for supplying an assembly part carrier to be equipped to a placement area and for removing an at least partially equipped assembly part carrier from the placement area;

a positioning system having at least one stationary component, which is attached in a stationary manner to the frame structure, and having a moveable component, which can be positioned relative to the stationary component;

the placement head according to claim 22, wherein the placement head is attached to the movable component and is configured to pick up assembly parts and, after a suitable positioning of the movable component, to equip the assembly part carrier with the assembly parts, wherein each assembly part is mounted on the assembly part carrier at a predetermined placement position.

* * * * *